United States Patent
Bienas et al.

(10) Patent No.: US 8,913,562 B2
(45) Date of Patent: Dec. 16, 2014

(54) METHOD OF ACCESSING A PHYSICAL RANDOM ACCESS CHANNEL, METHOD OF SIGNALING ACCESS INFORMATION FOR ACCESSING A PHYSICAL RANDOM ACCESS CHANNEL, MOBILE COMMUNICATION TERMINAL AND BASE STATION

(75) Inventors: Maik Bienas, Braunschweig (DE);
Hyung-Nam Choi, Hamburg (DE);
Achim Luft, Braunschweig (DE);
Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1029 days.

(21) Appl. No.: 12/262,207

(22) Filed: Oct. 31, 2008

(65) Prior Publication Data

US 2010/0113053 A1 May 6, 2010

(51) Int. Cl.
*H04W 4/00* (2009.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 74/08* (2009.01)
*H04W 74/00* (2009.01)

(52) U.S. Cl.
CPC .......... *H04W 74/085* (2013.01); *H04W 74/006* (2013.01); *H04W 74/0833* (2013.01); *H04W 74/0875* (2013.01)
USPC ........ 370/329; 370/230; 370/230.1; 370/235; 370/241; 370/328; 370/331; 370/338

(58) Field of Classification Search
None
See application file for complete search history.

(56) References Cited

U.S. PATENT DOCUMENTS

| | | | |
|---|---|---|---|
| 2004/0146019 A1* | 7/2004 | Kim et al. | 370/329 |
| 2008/0025285 A1* | 1/2008 | Kwon et al. | 370/344 |
| 2009/0109937 A1* | 4/2009 | Cave et al. | 370/336 |
| 2010/0002590 A1* | 1/2010 | Park et al. | 370/241 |
| 2010/0172299 A1* | 7/2010 | Fischer et al. | 370/328 |

OTHER PUBLICATIONS

3GPP TS 36.211: E-UTRA; Physical channels and modulation (Release 8), V8.4.0, Sep. 2008, chapter 5.7 physical random access channel, pp. 31-40 available at http://www.3gpp.org.
3GPP TS 25.211: Physical channels and mapping of transport channels onto physical channels (FDD) (Release 7), V7.6.0, May 2008, chapter 5.2.2 Common uplink physical channels, pp. 15-17 available at http://www.3gpp.org.
New WID: Stage2 for Registration in Densely-populated area (RED), from 3GPP-Meeting TSGS#37, Document-No. SP-070694, Sep. 17-20, 2007, available at http://www.3gpp.org.

* cited by examiner

*Primary Examiner* — Faruk Hamza
*Assistant Examiner* — Diane Lo
(74) *Attorney, Agent, or Firm* — Schwabe, Williamson & Wyatt, P.C.

(57) ABSTRACT

A method of accessing a physical random access channel, a method of signaling access information for accessing a physical random access channel, a mobile communication terminal and a base station are provided. The method of accessing a physical random access channel comprises selecting a plurality of transmission time intervals from transmission time intervals being allowed for accessing a physical random access channel, randomly selecting one transmission time interval of the plurality of transmission time intervals, and accessing the physical random access channel in the randomly selected transmission time interval. A mobile communication terminal is configured to carry out the method.

19 Claims, 7 Drawing Sheets

US 8,913,562 B2

METHOD OF ACCESSING A PHYSICAL RANDOM ACCESS CHANNEL, METHOD OF SIGNALING ACCESS INFORMATION FOR ACCESSING A PHYSICAL RANDOM ACCESS CHANNEL, MOBILE COMMUNICATION TERMINAL AND BASE STATION

TECHNICAL FIELD

Embodiments of the invention relate generally to a method of accessing a physical random access channel, to a method of signaling access information for accessing a physical random access channel, to a mobile communication terminal and to a base station.

BRIEF DESCRIPTION OF THE SEVERAL VIEWS OF THE DRAWINGS

In the drawings, like reference characters generally refer to the same parts throughout the different views. The drawings are not necessarily to scale, emphasis instead generally being placed upon illustrating the principles of the invention.

DETAILED DESCRIPTION OF THE INVENTION

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described below. Where applicable the description of a method embodiment is deemed to describe also the functioning of a corresponding device embodiment and vice versa.

The mobile communication system UMTS (Universal Mobile Telecommunications System) is currently enhanced in the 3GPP standardization committees. The new Radio Access Network is called "evolved UMTS Terrestrial Radio Access Network" (E-UTRAN). The activities in this regard are summarized under the general term "Long Term Evolution" (LTE). With LTE the maximum net transmission rates will be significantly increased, namely up to 300 Mbps in the downlink transmission direction and up to 75 Mbps in the uplink transmission direction. An LTE random access procedure will be needed for initial access and synchronization purposes.

It is generally desirable to make efficient use of the resources of a communication system. For example, it is desirable to use the radio resources of a radio communication system in an efficient manner when accessing a physical random access channel of the radio communication system.

In accordance with embodiments of the invention, a method of accessing a physical random access channel and a method of signaling access information for accessing a physical random access channel are provided.

Figure 1:
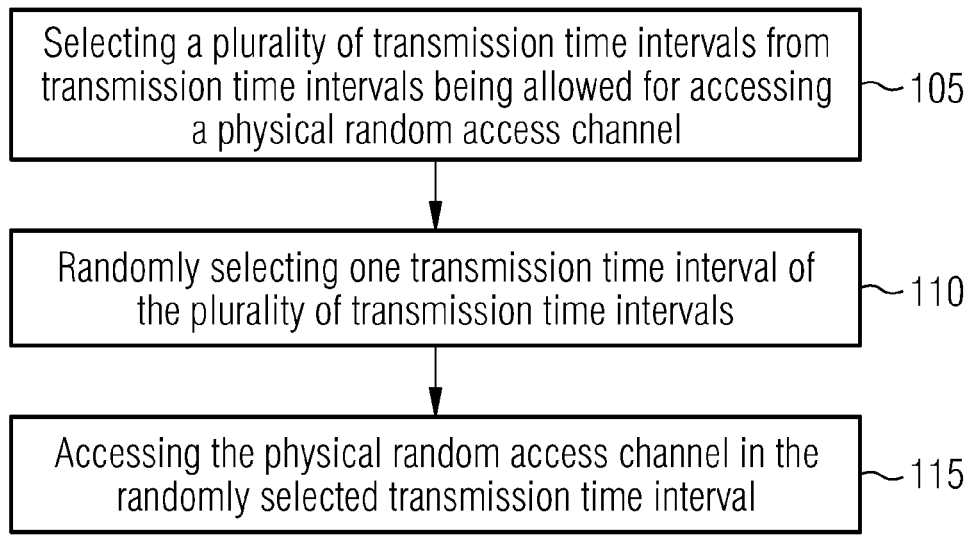
FIG. 1 shows a method of accessing a physical random access channel in accordance with an embodiment of the invention.

FIG. 1 shows a method of accessing a physical random access channel in accordance with an embodiment of the invention.

In 105 a plurality of transmission time intervals is selected from transmission time intervals being allowed for accessing a physical random access channel.

In 110 one transmission time interval of the plurality of transmission time intervals is randomly selected.

In 115 the physical random access channel is accessed in the randomly selected transmission time interval.

In another embodiment a mobile communication terminal is configured to carry out the method of accessing a physical random access channel shown in FIG. 1.

Figure 2:
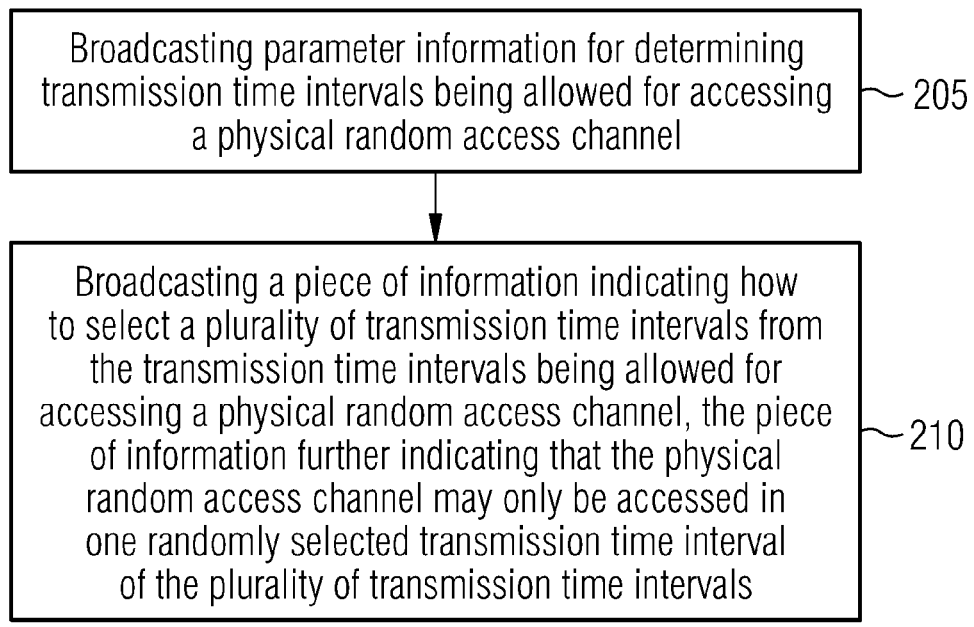
FIG. 2 shows a method of signaling access information for accessing a physical random access channel in accordance with an embodiment of the invention.

FIG. 2 shows a method of signaling access information for accessing a physical random access channel in accordance with an embodiment of the invention.

In 205 a parameter information for determining transmission time intervals being allowed for accessing a physical random access channel is broadcasted.

In 210 a piece of information is broadcasted. The piece of information indicates how to select a plurality of transmission time intervals from the transmission time intervals being allowed for accessing a physical random access channel. The piece of information further indicates that the physical random access channel may only be accessed in one randomly selected transmission time interval of the plurality of transmission time intervals.

In another embodiment a base station is configured to carry out the method of signaling access information for accessing a physical random access channel shown in FIG. 2.

New multiple access methods will be used for LTE. OFDMA (Orthogonal Frequency Division Multiple Access) is used in the downlink and SC-FDMA (Single Carrier—Frequency Division Multiple Access) in the uplink.

Further, the following three types of duplexing methods will be supported in LTE: full-duplex FDD (frequency division duplex), half-duplex FDD and TDD (time division duplex). Full-duplex FDD uses two separate frequency bands for uplink and downlink transmissions, denoted as $f_{DL}$ and $f_{UL}$, and both transmissions can occur simultaneously. Half-duplex FDD also uses two separate frequency bands for uplink and downlink transmissions, but both transmissions are non-overlapping in time. TDD uses the same frequency band for transmission in both uplink and downlink. Within a time frame the direction of transmission is switched alternatively between downlink and uplink.

In LTE two frame structure types will be used.

Figure 3:
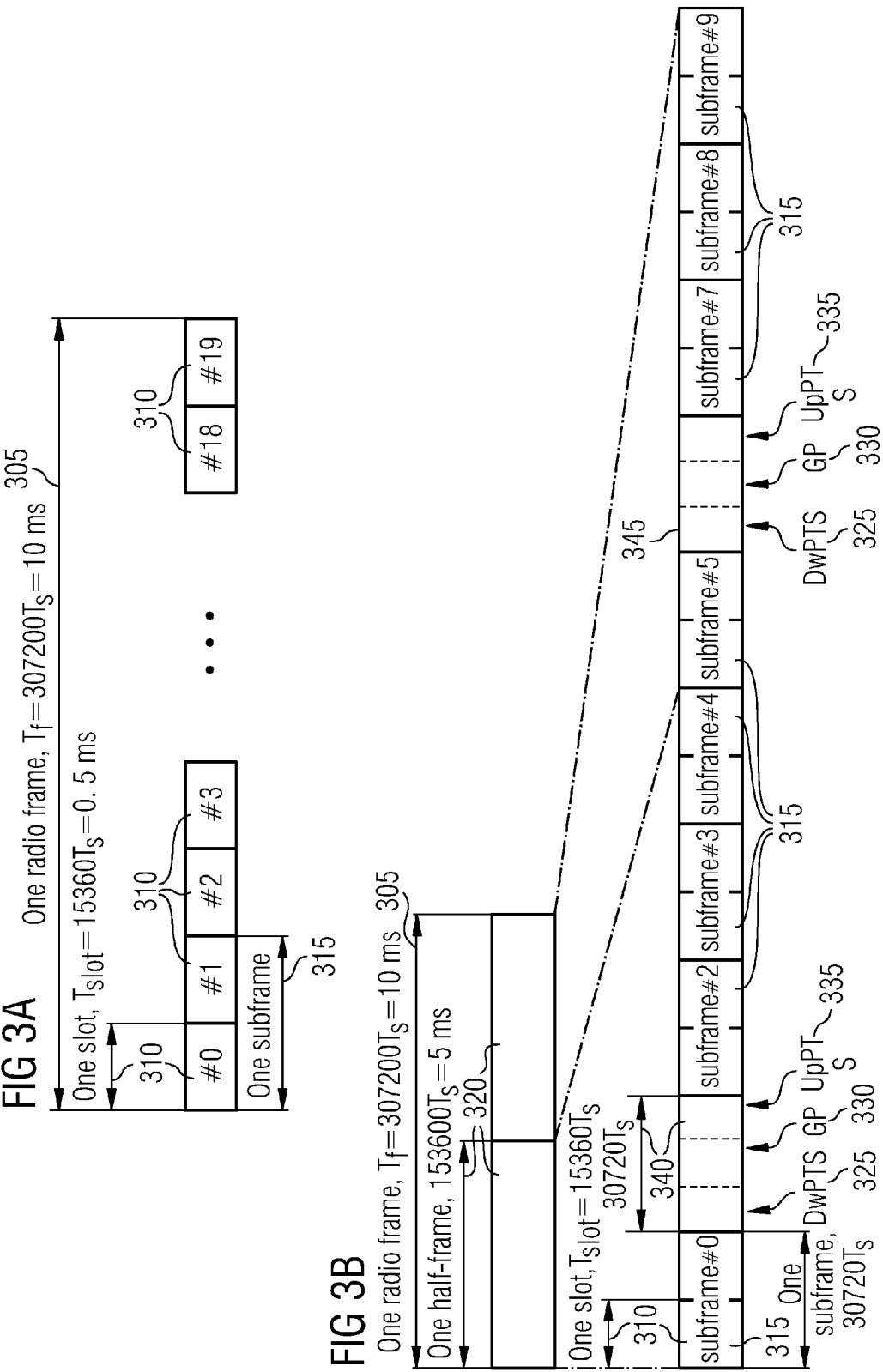
FIG. 3A shows a radio frame structure to be used in frequency division duplex accessing in accordance with an embodiment of the invention.
FIG. 3B shows another radio frame structure to be used in time division duplex accessing in accordance with an embodiment of the invention.

FIG. 3A shows a radio frame structure to be used in frequency division duplex accessing in accordance with an embodiment of the invention.

This frame structure type 1 is applicable to both full-duplex and half-duplex FDD. Each radio frame 305 is 10 ms long and consists of 20 slots 310 of length 0.5 ms, numbered from 0 to 19. A subframe 315 is defined as two consecutive slots. For FDD, 10 subframes are available for downlink transmission and 10 subframes are available for uplink transmissions in each 10 ms interval. Uplink and downlink transmissions are separated in the frequency domain.

FIG. 3B shows another radio frame structure to be used in time division duplex accessing in accordance with an embodiment of the invention.

This frame structure type 2 is applicable to TDD. Each radio frame 305 consists of two half-frames 320 of length 5 ms each. Each half-frame 320 consists of eight slots 310 of length 0.5 ms and three special fields, DwPTS 325, GP 330, and UpPTS 335. The lengths of DwPTS 325 and UpPTS 335 are configurable subject to the total length of DwPTS, GP and UpPTS being equal to 1 ms. Subframes #1 340 and #6 345 each consist of DwPTS 325, GP 330 and UpPTS 335, all other subframes 315 are defined as two slots.

In LTE a random access procedure is needed for initial access and synchronization purposes. According to various embodiments of the invention advantageous solutions for selecting PRACH (physical random access channel) transmission time instants are proposed which are applicable for all three duplexing modes of LTE and also for UMTS (i.e. a release prior to LTE).

The uplink of E-UTRAN uses three physical channels: Physical Uplink Shared Channel (PUSCH), Physical Uplink Control Channel (PUCCH) and Physical Random Access Channel (PRACH). The distribution of radio resources allocated to these three types of physical uplink channels in the frequency domain and the time domain is further explained in the following.

Figure 4:
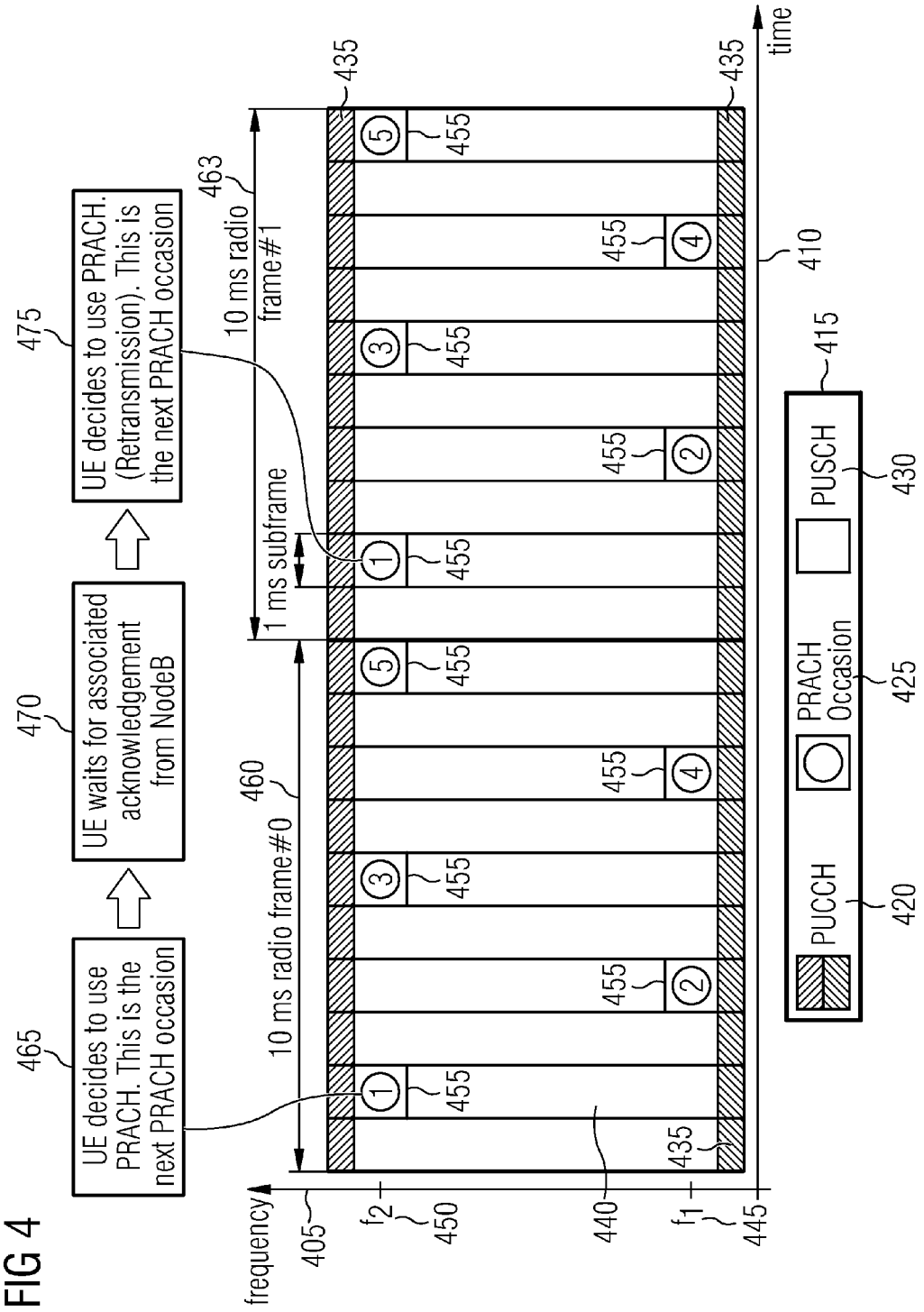
FIG. 4 shows an uplink radio resource grid with PRACH (physical random access channel) occasions in accordance with an embodiment of the invention.

FIG. 4 shows an uplink radio resource grid with PRACH (physical random access channel) occasions in accordance with an embodiment of the invention.

The radio resource grid is shown as a coordinate system having a frequency coordinate 405 and a time coordinate 410. Portions of the radio resources which are defined by frequency intervals and time intervals are allocated to the different physical uplink channels. In a legend 415 outside the radio resource grid it is shown how an allocation of radio resource portions to the PUCCH 420, the PRACH 425 ("PRACH Occasion") or the PUSCH 430, respectively, is symbolized in the drawing.

The subcarriers 435 at both edges of the transmission bandwidth (in the frequency domain) available for an UE (user equipment, mobile communication terminal) are reserved for the PUCCH 420. The subcarriers 440 between the PUCCH subcarriers may be used for PUSCH 430 or PRACH 425. The allocation to PUSCH 430 or PRACH 425 is defined dynamically (in the time domain) by the eNodeB (base station). For FDD mode overall 16 PRACH configurations are defined, see Table 1.

TABLE 1

Random Access preamble timing for FDD

| PRACH configuration | System frame number | Subframe number |
|---|---|---|
| 0 | Even | 1 |
| 1 | Even | 4 |
| 2 | Even | 7 |
| 3 | Any | 1 |
| 4 | Any | 4 |
| 5 | Any | 7 |
| 6 | Any | 1, 6 |
| 7 | Any | 2, 7 |
| 8 | Any | 3, 8 |
| 9 | Any | 1, 4, 7 |
| 10 | Any | 2, 5, 8 |
| 11 | Any | 3, 6, 9 |
| 12 | Any | 0, 2, 4, 6, 8 |
| 13 | Any | 1, 3, 5, 7, 9 |
| 14 | Any | 0, 1, 2, 3, 4, 5, 6, 7, 8, 9 |
| 15 | Even | 9 |

The example depicted in FIG. 4 is based on PRACH configuration #13 of Table 1. In this example two frequency regions are allocated to PRACH transmission. The centers of these frequency regions are marked with "f1" 445 and "f2" 450. Not all subframes (frame with 1 ms duration) are used for PRACH 425. According to PRACH configuration #13 overall five subframes 455 are allowed to be used for PRACH within one radio frame. Radio frame #0 460 and radio frame #1 463 are shown in FIG. 4. The allowed subframes 455 are called "PRACH occasions". The number of PRACH occasions and the subframes to use will be configured by the network. The number of PRACH occasion varies from 1 occasion in 20 ms up to 10 PRACH occasions in 10 ms. On the PRACH a preamble sequence is transmitted. Overall, 64 preamble sequences can be configured in a radio cell.

One possible approach for transmitting PRACH is as follows: When an UE wants to use the PRACH, it uses the next available PRACH occasion 465 (PRACH occasion #1 in radio frame #0 460) for transmission. Then the UE waits for an acknowledge by the network (base station) acknowledging proper receipt of the PRACH transmission. In case, that the UE didn't receive an associated acknowledge message from the eNodeB within a predefined waiting period 470 after the initial PRACH transmission, it performs a PRACH retransmission at the then next available PRACH occasion 475 (PRACH occasion #1 in radio frame #1 463). The rule to select the next available PRACH occasion for transmission is also valid for the retransmission.

Generally the random access is characterized by the probability of data collision. The resource used for transmission of the random access preamble is selected randomly by each UE. The more UEs wants to transmit a random access preamble, the higher is the probability of collision, i.e. that two or more UEs selects the same resource for transmission. Each collision leads to an unsuccessful transmission and will result in a retransmission. Each retransmission is undesirable, as it is a waste of resources. The physical channel structure for PRACH is defined in [1] for LTE and in [2] for UMTS.

According to an embodiment of the invention one transmission time interval of a plurality of transmission time intervals which are allowed to be used for a physical random access channel transmission is randomly selected and the physical random access channel transmission is performed in the randomly selected transmission time interval.

This has, among other things, the following three effects:

1. The delay of PRACH preamble transmission caused by collisions in an overload situation can be reduced. With the term "overload situation" the following is meant: In case that much more UEs wants to perform a PRACH access than PRACH capacity is available (PRACH overload), most transmissions will lead to a collision and the PRACH access will be blocked from the beginning of such massive PRACH accesses until further methods will dissolve the blocking. This leads to a waste of PRACH resources and unsatisfying user experiences, as e.g. call setups are not possible during this blocking phase. This issue occurs regularly in the subway in the city of Tokyo during rush hour, when several 1000 UEs in the subway simultaneously want to perform a Location Area Update or Routing Area Update after the subway has passed a respective area border. This issue is handled at 3GPP in the work item "Registration in densely populated areas" (RED), see [3].

2. A prioritized PRACH preamble transmission can be realized. This is useful since PRACH is used for different tasks, e.g. for initial connection establishment or to make a time alignment between the uplink and downlink channels (synchronisation). Some tasks are more important than other tasks, e.g. to initiate an emergency call is more important than to make time alignments of usual connections. With the approach for transmitting PRACH where an UE always uses the next available PRACH occasion for transmission no opportunity to prioritize usage of the PRACH is available. In case that many UEs try to use the PRACH, more important data may be delayed with same probability than less important data as every UE uses the same procedure with the same parameters, i.e. they always try to transmit at the next available PRACH occasion.

3. The benefit of frequency hopping can be applied to the PRACH. Frequency hopping at the PRACH refers to the question, whether the frequency used for a retransmission should be different from the frequency used for the first (or initial), or in general a previous, transmission. Even in case, that two or more frequency regions are allocated for the PRACH, frequency hopping is not controlled or enforced or systematically deployed with the approach for transmitting PRACH where an UE always uses the next available PRACH occasion for transmission. FIG. 4 shows the case, where two frequency regions 445 and 450 are allocated for PRACH but no frequency hopping is applied for the retransmission 475 after an initial transmission 465.

Frequency hopping is generally and especially for LTE beneficial as can be seen from the following: As already mentioned new multiple access methods will be used for LTE. OFDMA (Orthogonal Frequency Division Multiple Access) is used in the downlink and SC-FDMA (Single Carrier—Frequency Division Multiple Access) in the uplink. These techniques enable a very flexible usage of the radio resources as the system bandwidth is split into several very small subbands which are called subcarriers. A group of 12 adjacent subcarriers with the duration of 0.5 ms is called "resource block". A resource block is the smallest portion from the radio resource that can be allocated by the eNodeB (LTE transceiver station). The allocation of resource blocks to a specific UE (User Equipment) can change from one time instance to another (time coordinate 410) in terms of number of allocated subcarriers (i.e. the usable bandwidth for this UE) and position of the subcarriers in the frequency domain (frequency coordinate 405). To change the position of the subcarriers allocated to one specific UE with a specific pattern is called "frequency hopping". The utilization of frequency hopping in downlink and uplink is beneficial, as it distributes bad radio conditions, which are typical in mobile radio channels, to different UEs and, in time domain, of a specific UE, so that error correction methods can effectively eliminate the effects of bad radio conditions.

According to various embodiments of the invention various advantageous solutions for selecting PRACH transmission time instants ("PRACH Occasions") are proposed which are applicable for all three duplexing modes in LTE.

In an embodiment PRACH occasions windows (POWs) are defined, which are used by an UE to select a PRACH occasion for the next PRACH transmission. A PRACH occasion is selected randomly from the set of available PRACH occasions within the POW.

In an embodiment the selection of a PRACH occasion is done randomly with equal probability among all available PRACH occasions within the POWs based on the configured PRACH slot configuration.

In an embodiment the length of POW is configurable, e.g. 10, 20 and 40 ms. This is favorable as it offers the opportunity to prioritize PRACH access, i.e. to prefer more important data among less important data and/or to prefer retransmitted data among first time transmitted data. A shorter window length will result in a shorter transmission delay which may be intended for use for higher prioritized data.

In an embodiment the length of the POW is selected based on the priority of the PRACH transmission. The priority may depend on the PRACH usage intention (importance of usage) and/or the number of failed previous PRACH transmission attempts.

In an embodiment an own POW is defined for each frequency region which is dedicated for PRACH.

In an embodiment several POWs are defined such that POWs exist in different frequency domains at the same time interval. This defining of locations of POWs enables to change the frequency used for PRACH.

In an embodiment a failed PRACH transmission causes to change to a POW of another frequency region for the retransmission. This enables frequency hopping for PRACH.

In an embodiment the UE selects randomly one POW (in case more than one frequency region is available) and one PRACH occasion from the selected POW for the initial PRACH transmission. The length of the POW is dependent on the intention of the PRACH transmission. The more important the intention is, the shorter is the POW.

In an embodiment the length of the initial POW can be set to a high value to overcome PRACH overload situations (especially the RED scenario) by spreading the PRACH accesses in time. For that issue, the mobile network sets the value appropriately and signals it to all UEs in the affected cell. This may by done as part of the PRACH configuration signaling in the broadcasted system information, or as a special flag which indicates that temporarily a special initial POW length must be applied for PRACH accesses. In an embodiment the length of the initial POW may be set to an extremely high value, e.g. 10 seconds. A high value setting for the POW as described here is referred to as "PRACH overload avoidance mode" or "PRACH blocking avoidance mode" in this application.

A PRACH overload avoidance mode may generally be applied for all PRACH accesses and especially for LAU/RAU/TAU (location area update, routing area update, tracking area update). It can be used to overcome any PRACH overload situations for LTE and for UMTS. Especially the overload scenario assumed for the 3GPP work item "RED" can be solved. Applying PRACH overload avoidance mode for LAU/RAU/TAU only has already the effect that PRACH overload can be avoided in the RED scenario (e.g. the Tokyo subway example) and the delay for PRACH access in such case can be reduced significantly.

In an embodiment a warning message warning of a PRACH overload condition is signalled from an affected NodeB to one or more neighboring NodeBs. The neighboring NodeBs switch to PRACH overload avoidance mode. Therefore PRACH overload can be avoided by the neighboring NodeBs.

In an embodiment one or more NodeBs potentially affected by overload are informed prior to an actual occurrence of PRACH overload at that NodeBs. PRACH accesses at that NodeBs are spread in time, so that the number of actual accesses will be lower than the PRACH capacity and no PRACH overload will occur at that NodeBs.

For a PRACH retransmission (a transmission after an unsuccessful previous PRACH transmission) several options in different combinations are available: In an embodiment the UE selects a PRACH occasion from a POW in another frequency region than that used for the previous transmission. In another embodiment the UE reduces the POW length, e.g. from 40 ms to 30 ms. In yet another embodiment the UE excludes the frequency/time position corresponding to the previous PRACH occasion from the set of PRACH occasions within the POW for the retransmission. In yet another embodiment two or more of these options are combined with each other.

Figure 5:
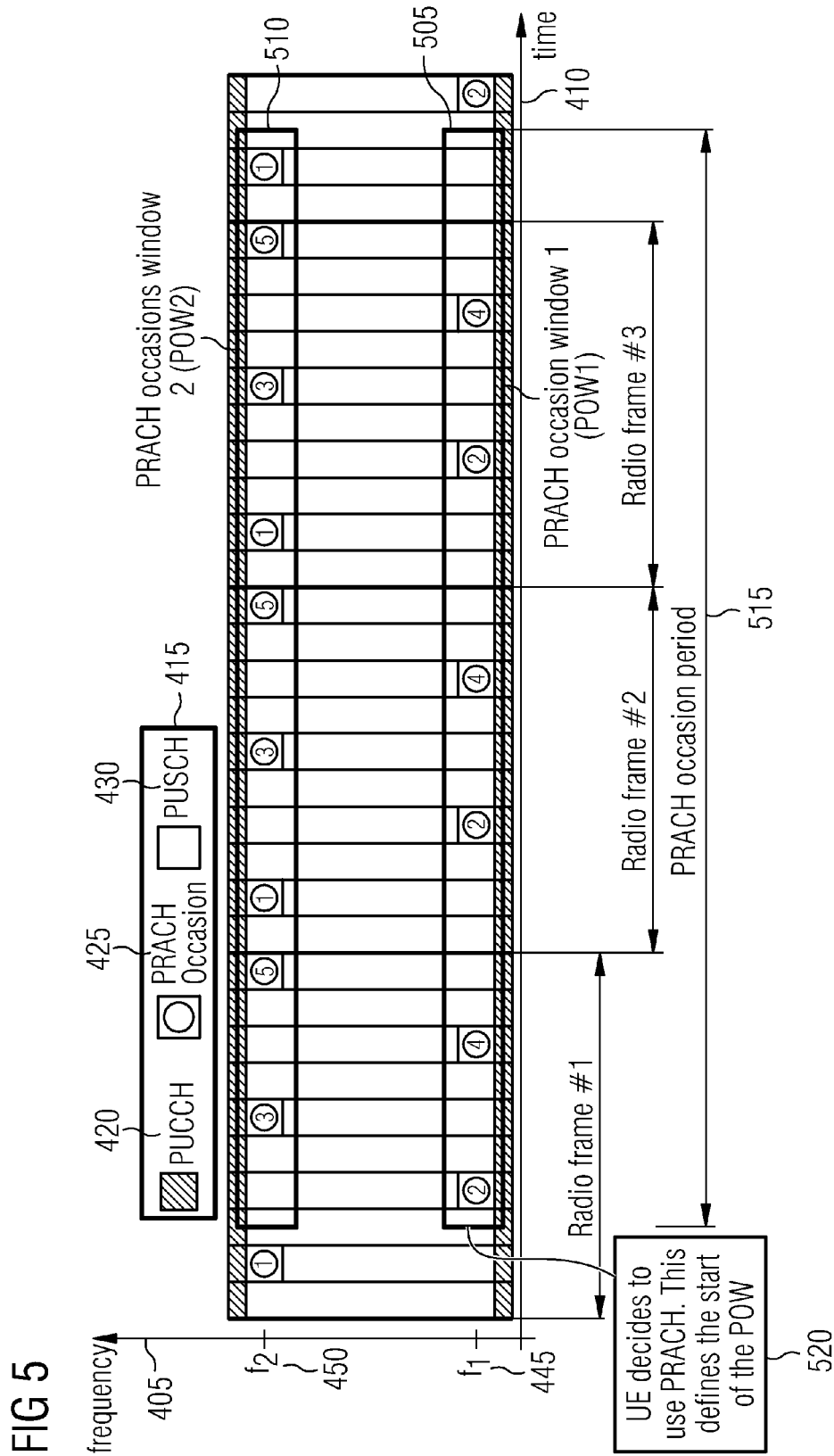
FIG. 5 shows an uplink radio resource grid with two PRACH occasions windows for PRACH transmissions in accordance with an embodiment of the invention.

FIG. 5 shows an uplink radio resource grid with two PRACH occasions windows for PRACH transmissions in accordance with an embodiment of the invention. In this embodiment an LTE system having a SC-FDMA multiple access scheme in uplink is considered.

The radio resource grid in FIG. 5 is shown in a fashion similar to that of FIG. 4 as a coordinate system having a frequency coordinate 405 and a time coordinate 410. Portions of the radio resources which are defined by frequency intervals and time intervals are allocated to the different physical uplink channels. In a legend 415 outside the radio resource grid it is shown how an allocation of radio resource portions to the PUCCH 420, the PRACH 425 ("PRACH Occasion") or the PUSCH 430, respectively, is symbolized in the drawing. It is also assumed that similar to the situation of FIG. 4 two frequency regions $f_1$ 445 and $f_2$ 450 and the PRACH configuration #13 of Table 1 are configured by the network for PRACH use.

For the selection of the next PRACH occasion two PRACH occasions windows (POWs) are defined, POW1 505 at $f_1$ and POW2 510 at $f_2$, i.e. one window for each frequency region that is allocated for the PRACH. Based on this separation per frequency region, it is possible to enforce frequency hopping for each UE that transmits a preamble on the PRACH more than one time, i.e. when at least one retransmission is needed.

The POWs 505, 510 each have a specific length called "PRACH occasions period" 515. The length is variable and depends on the priority to use PRACH and on the number of necessary retransmissions (due to one or more unsuccessful previous transmission attempts), i.e. based on the PRACH occasions period 515 it is possible to set different priorities and a higher number of retransmissions leads to a higher priority. The shorter the period the shorter is the delay for a successful PRACH transmission. In the example depicted in FIG. 5 the PRACH occasions period 515 is 30 ms for both POW1 505 at $f_1$ and POW2 510 at $f_2$. An example how to set these values is shown in table 2 (ms=milliseconds).

TABLE 2

Parameters for a PRACH occasions window used for PRACH access prioritization

| PRACH usage intention | PRACH occasions period for 1. (initial) transmission | Step size for period reduction for retransmissions | Minimum PRACH occasions period |
| --- | --- | --- | --- |
| Connection setup | 20 ms | 10 ms | 1 ms |
| Tracking Area Update | 40 ms | 10 ms | 5 ms |
| Synchronisation | 50 ms | 5 ms | 1 ms |
| . . . | . . . | . . . | . . . |

The PRACH occasions period 515 starts when the UE decides to use PRACH at 520. A PRACH occasion for transmission is then selected randomly from the set of available PRACH occasions within the POW 505, 510.

A procedure for PRACH transmission is now described in items 1 to 12 below. It is assumed that the UE already received all parameters needed for PRACH access from the network, e.g. the PRACH configuration and the frequency regions.

1. The UE decides to use the PRACH, because it wants to report its current location to the network (called "Tracking Area Update").

2. The UE selects for the first (initial) PRACH transmission a PRACH occasion randomly from the PRACH occasions available in the currently valid POW. The length of this POW is set based on the PRACH usage intention (Tracking Area Update) according to table 2, i.e. 40 ms. For simplicity it is assumed that the same PRACH occasion 465 as in the example of FIG. 4 is selected (but now randomly). The randomly selected PRACH occasion 465 is PRACH occasion #1 at frequency region $f_2$ 450 in radio frame #0 460. The UE then transmits a PRACH preamble in the time interval of this PRACH occasion. Details of how to select a preamble and how to set the transmission power are described in [1].

3. The UE listens for the associated acknowledgement of this PRACH preamble from the network. It is assumed that the UE expects the acknowledgement within the waiting period 470 which is within 10 ms after PRACH transmission, i.e. until PRACH occasion #1 in radio frame #1 463. In this example the UE does not receive an acknowledgement because the network (base station) did not receive the PRACH preamble sent by the UE. A first PRACH retransmission is now needed.

Figure 6:
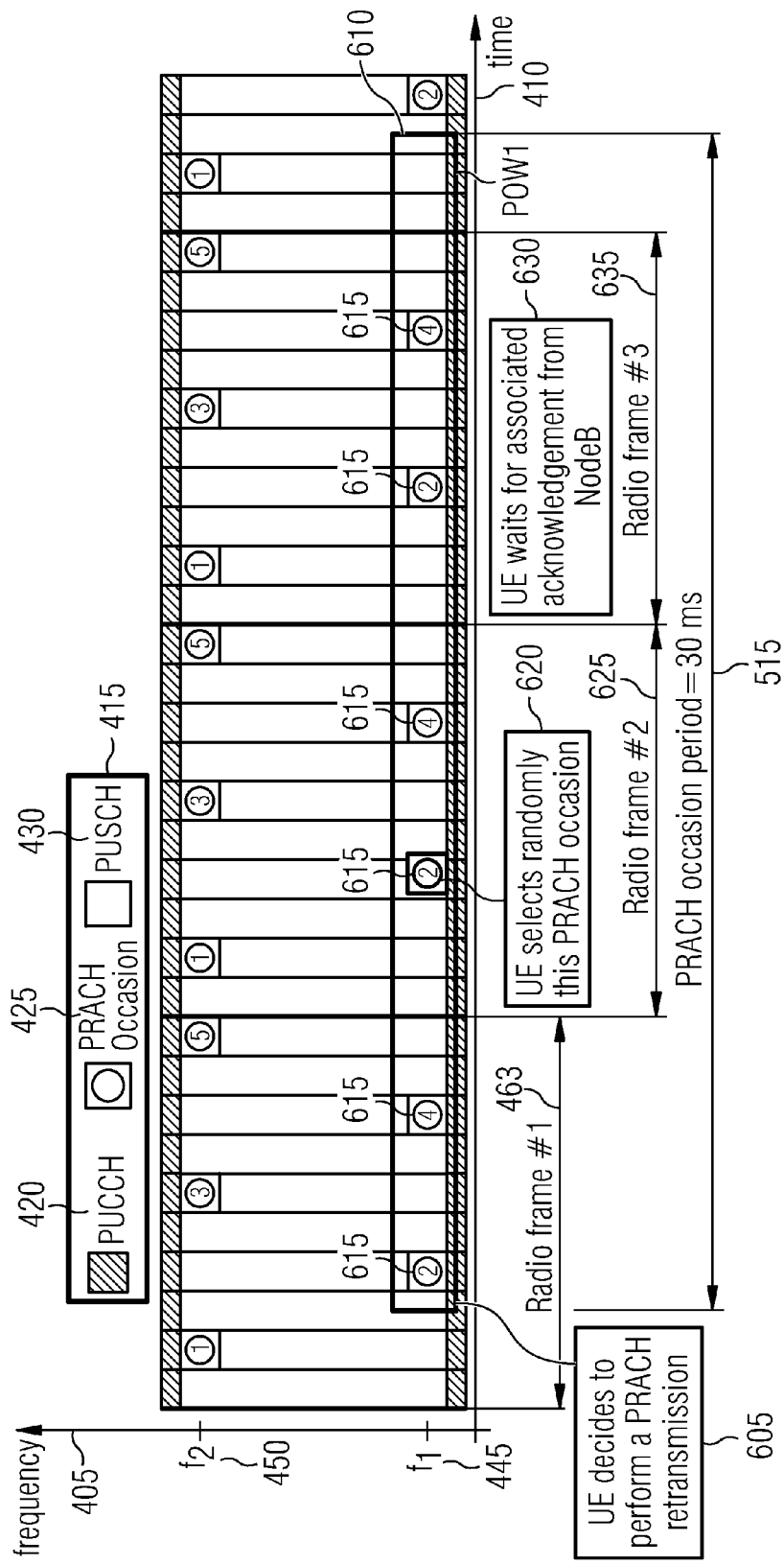
FIG. 6 shows an uplink radio resource grid with a PRACH occasions window for a first PRACH retransmission in accordance with an embodiment of the invention.

FIG. 6 shows an uplink radio resource grid with a PRACH occasions window for a first PRACH retransmission in accordance with an embodiment of the invention. The radio resource grid in FIG. 6 is shown in a fashion similar to that of FIG. 4.

4. The UE decides to perform a first PRACH retransmission at 605. Therefore it selects the PRACH occasions period 515 for the first retransmission based on the PRACH usage intention (Tracking Area Update) according to table 2, i.e. 30 ms (40 ms reduced by one step size of 10 ms).

5. The UE selects the POW in such a manner that the used frequency range is different from the frequency range used in the previous PRACH transmission. In this case it selects POW1 610 at $f_1$ 445. The POW1 610 starts at the current time instance, i.e. at 605.

6. PRACH occasions #2 and #4 are available at $f_1$ 445 in each radio frame, i.e. six PRACH occasions 615 are available within POW1 610. The UE selects randomly one PRACH occasion 620. In this case it selects PRACH occasion #2 of radio frame #2 625.

7. The UE transmits a PRACH preamble at the selected PRACH occasion 620.

8. The UE listens for the associated acknowledgement of this PRACH preamble from the network. It is assumed that the UE expects the acknowledgement within the waiting period 630 which is within 10 ms after PRACH transmission, i.e. until PRACH occasion #2 of radio frame #3 635. In this example the UE does not receive an acknowledgement because the network (base station) did not receive the PRACH preamble sent by the UE. A second PRACH retransmission is now needed.

Figure 7:
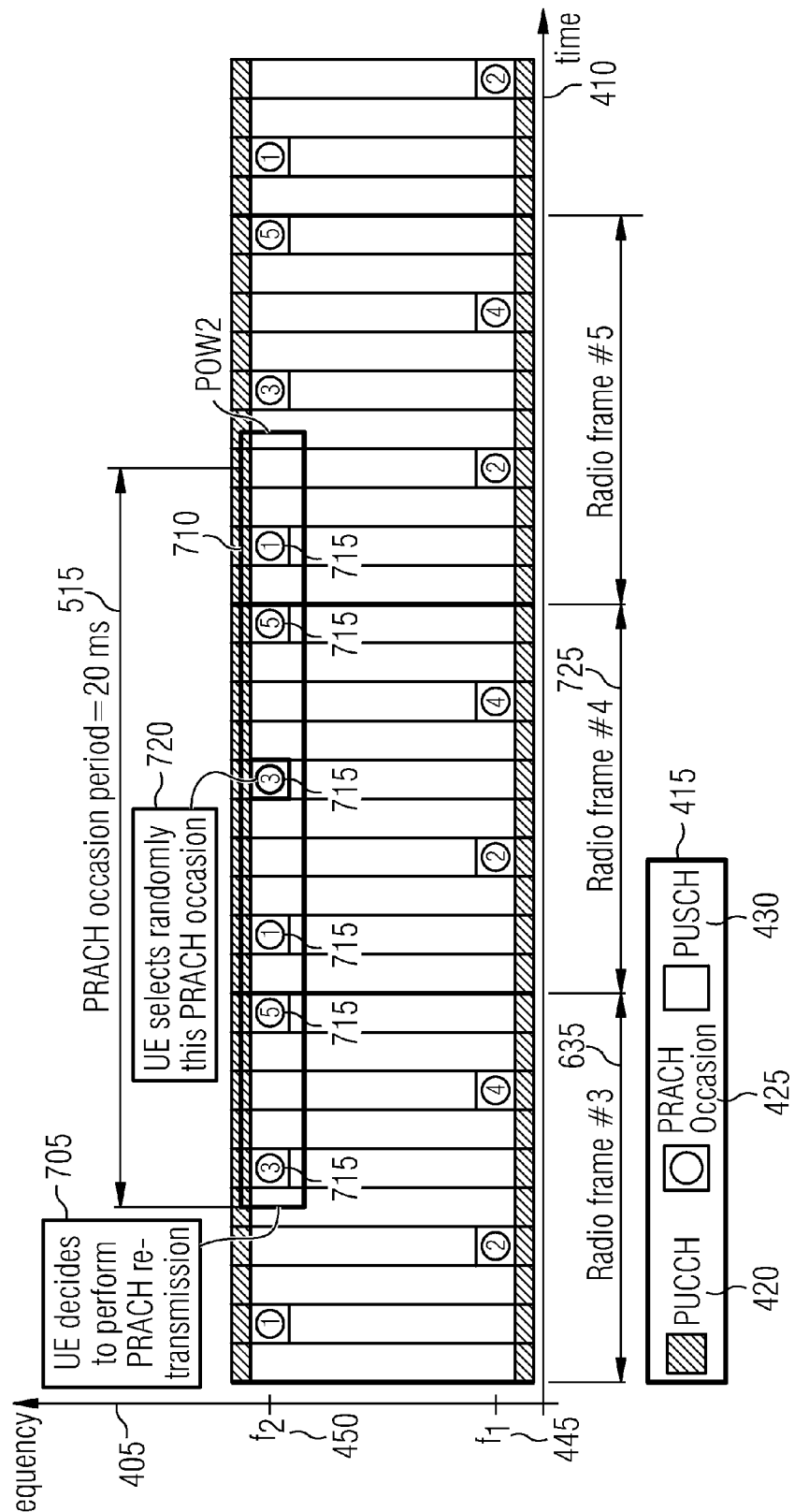
FIG. 7 shows an uplink radio resource grid with a PRACH occasions window for a second PRACH retransmission in accordance with an embodiment of the invention.

FIG. 7 shows an uplink radio resource grid with a PRACH occasions window for a second PRACH retransmission in accordance with an embodiment of the invention. The radio resource grid in FIG. 7 is shown in a fashion similar to that of FIG. 4.

9. The UE decides to perform a second PRACH retransmission at 705. It selects a POW at another frequency range than the previous transmission, i.e. it selects POW2 710 at $f_2$ 450. It reduces the PRACH occasion period 515 according to table 2 by 10 ms. The PRACH occasions period is now 20 ms.

10. PRACH occasions # 1, #3 and #5 are available at $f_2$ 450 in each radio frame, i.e. six PRACH occasions 715 are available in POW2 710. The UE selects randomly one PRACH occasion 720, i.e. PRACH occasion #3 in radio frame #4 725 for this retransmission.

11. The UE retransmits the PRACH preamble at the selected PRACH occasion 720 in a second PRACH retransmission. It takes into account the rules for retransmissions defined in [1], e.g. to increase the transmission power.

12. It is assumed that the second retransmission is successful, i.e. the network receives the PRACH preamble. Therefore the PRACH access procedure of this example ends here.

In case that the second retransmission is not successful, the UE will proceed with repeating item 9 (above). It will prepare and perform further PRACH retransmissions (a third, fourth, and so on) until one retransmission is successful or rules defined in [1] will end the procedure, e.g. if the maximum number of allowed retransmissions is reached.

For every retransmission the following takes place: The used frequency range is changed and the PRACH occasions period is reduced by one step size. In case, that the PRACH occasions period reduced by one step size would be shorter than the minimum PRACH occasion period defined in Table 1, this minimum PRACH occasion period will be applied.

Figure 8:
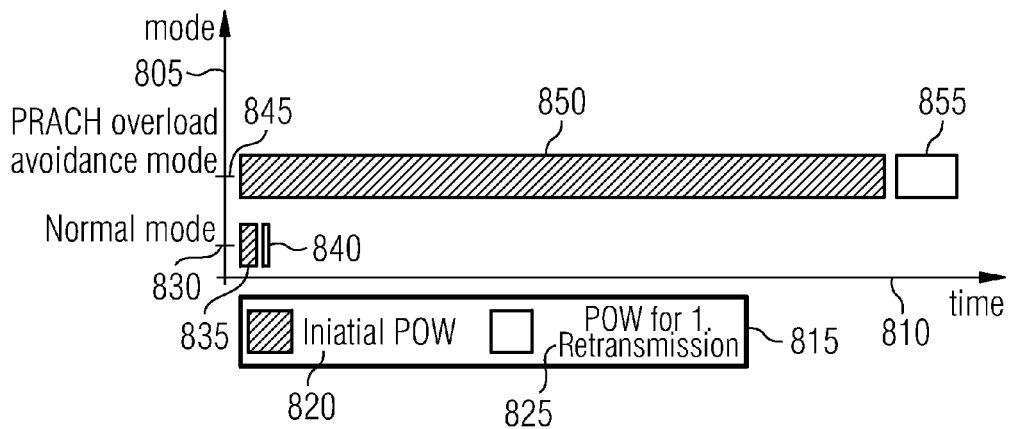
FIG. 8 shows PRACH occasions windows for PRACH transmissions in normal mode and shows PRACH occasions windows for PRACH transmissions in PRACH overload avoidance mode.

FIG. 8 shows PRACH occasions windows (POWs) for PRACH transmissions in normal mode and shows PRACH occasions windows for PRACH transmissions in PRACH overload avoidance mode.

POWs are shown here in a diagram having a mode coordinate 805 and a time coordinate 810. In a legend 815 outside the diagram it is shown how an initial POW 820 (which is to be used for a first or initial PRACH transmission) and how a POW for a first retransmission 825 (which is to be used for a first retransmission after an initial PRACH transmission failed) are symbolized in the drawing.

In a normal mode 830, which refers to usual operation of a radio cell or base station, the initial POW for that mode 835 is relatively short. In the normal mode 830 the POW for a first retransmission for that mode 840 is even shorter.

In a PRACH overload avoidance mode 845 (also referred to as PRACH blocking avoidance mode) the initial POW for that mode 850 is very long compared to the situation at the normal mode 830. In the PRACH overload avoidance mode 845 the POW for a first retransmission for that mode 855 is shorter than the corresponding initial POW 850 but still considerably longer than any of the POWs 835, 840 at the normal mode 830.

The NodeB, which is in PRACH blocking avoidance mode, sets the parameters for the POW in that manner, that initial PRACH transmissions are widely spread in time. The less important and/or the more frequent the PRACH usage per each intentions are in that scenario, the more they are spread in time. This is achieved by setting the initial PRACH occasions period to a very high value. Table 3 shows an example.

TABLE 3

Parameters for the PRACH occasions window in PRACH overload avoidance mode

| PRACH usage intention | $T_i$, Initial PRACH occasions period | Step size for period reduction for retransmissions | Minimum PRACH occasions period |
|---|---|---|---|
| Connection setup | 400 ms | 50 ms | 1 ms |
| Location Area Update, Routing Area Update, Tracking Area Update | 10000 ms | 9900 ms | 100 ms |
| ... | ... | ... | ... |

In an example scenario it is assumed, that area updates (LAU, RAU or TAU) occur much more frequently than other PRACH usage intentions. It is assumed, that 1000 UEs wants to perform an LAU, RAU or TAU within the next 5 seconds. It is also assumed, that at maximum 500 PRACH accesses could be successfully handled by the NodeB in 5 seconds in case that no collisions occur. This means, on average every PRACH occasion is used by two UEs and the PRACH transmission is therefore in most cases not successful. Without setting the initial PRACH occasions period to a very high value, only few PRACH accesses will be successful and many retransmissions must be performed. This blocking may last a long time, unless measures are taken to delay the PRACH accesses.

The blocking of the PRACH in overload conditions can be avoided from the beginning if the initial PRACH occasions period $T_i$ is set appropriately, i.e. such that the number of PRACH accesses is always below the PRACH capacity of the NodeB so that no collisions will occur. The following formula (1) may be used to choose an appropriate value for $T_i$:

$$T_i > \text{access period} * (\text{accesses during access period} / \text{RACH capacity during access period}) \quad (1)$$

Here "access period" is the duration, in which most UEs decides to start a PRACH access. The "RACH capacity" is the maximum number of successful PRACH accesses in the access period if no collisions occur, i.e. the theoretically possible maximum number of successful PRACH accesses in the access period. It may also be considered that some accesses need one or more retransmissions, thus leading to a higher number of attempted accesses during the access period.

Applying formula (1) to the considered example scenario gives: $T_i > 5$ s*(1000/500)=10 s (10 seconds) This the minimum recommended value for $T_i$.

Figure 9:
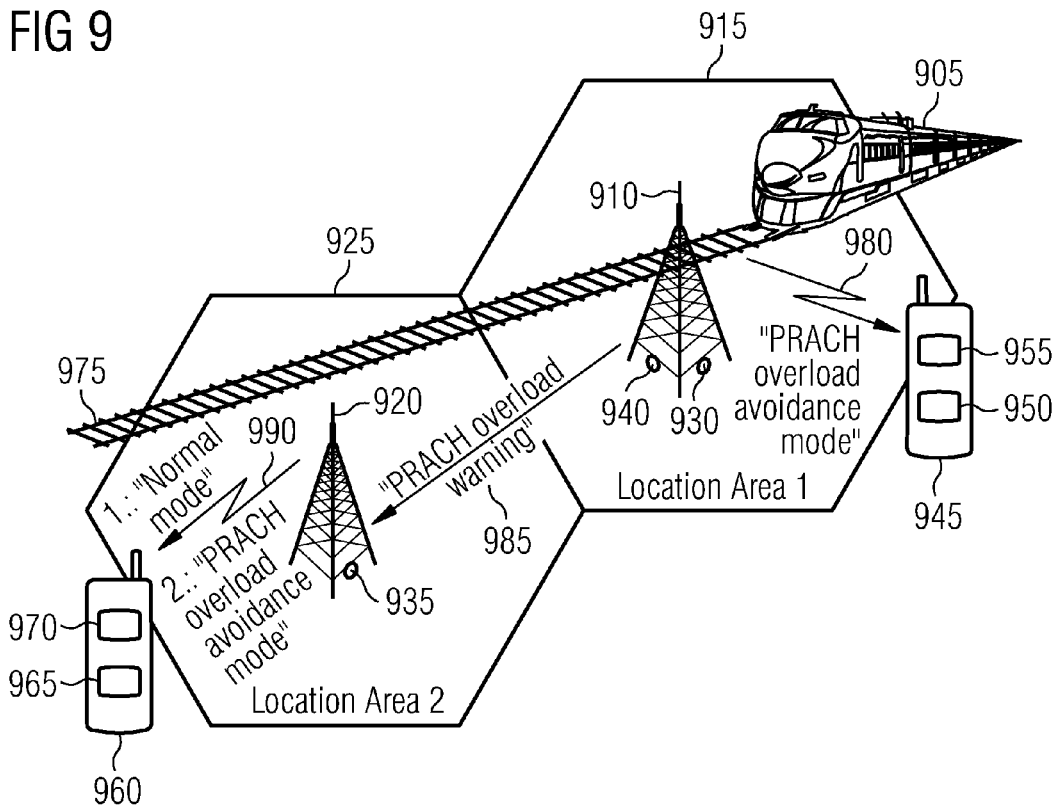
FIG. 9 shows mobile communication terminals in accordance with an embodiment of the invention and shows base stations in accordance with embodiments of the invention.

FIG. 9 shows mobile communication terminals in accordance with an embodiment of the invention and shows base stations in accordance with embodiments of the invention. It furthermore illustrates a method in accordance with an embodiment of the invention where PRACH blocking avoidance is applied in an overload case. The assumed overload case is a scenario according to a special issue of the communication system UMTS (Work item "RED"). The illustrated method is also applicable for other overload cases in UMTS and furthermore in LTE.

We assume, that many people are using the subway 905 in the city of Tokyo during rush hour. Most of them have switched on their mobile phones (more generally speaking: UEs or mobile communication terminals) but are not connected to the network, i.e. their UEs are in idle mode. All UEs in idle mode are scanning regularly the received signals from surrounding NodeBs (base stations). Other people outside the subway 905 may also carry UEs or mobile communication terminals scanning the received signals from surrounding NodeBs.

One NodeB 910 serves a first location area 915 and another NodeB 920 serves a second location area 925.

The NodeB (base station) 910 has a broadcasting unit 930 configured to broadcast parameter information for determining transmission time intervals being allowed for accessing a physical random access channel and further to broadcast a piece of information indicating how to select a plurality of transmission time intervals from the transmission time intervals being allowed for accessing a physical random access channel, the piece of information further indicating that the physical random access channel may only be accessed in one randomly selected transmission time interval of the plurality of transmission time intervals. The other NodeB (base station) 920 has a broadcasting unit 935 configured in the same way as the broadcasting unit 930.

The NodeB (base station) 910 furthermore has a messaging unit 940 to send a message to a neighbouring base station of the NodeB (base station) 910, the message indicating a blocking avoidance mode of the physical random access channel at the NodeB (base station) 910.

One mobile communication terminal 945 in the first location area 915 is currently in the idle mode and receives signals from the NodeB 910. The mobile communication terminal 945 has a control unit 950 configured to select a plurality of transmission time intervals from transmission time intervals being allowed for accessing a physical random access channel and further to randomly select one transmission time interval of the plurality of transmission time intervals. It furthermore has a transmit unit 955 to access the physical random access channel in the randomly selected transmission time interval.

Another mobile communication terminal 960 in the second location area 925 is currently in the idle mode and receives signals from the other NodeB 920. The mobile communication terminal 960 has a control unit 965 configured in the same way as the control unit 950 and furthermore has a transmit unit 970 configured in the same way as the transmit unit 955.

While the subway 905 moves along its track 975, a formerly best suited NodeB will disappear and new NodeBs with better signal quality will appear. Every time an UE detects, that a new suitable NodeB appears, which belongs to another so called "location area" or "routing area" (or "tracking area" in LTE), it has to perform a "Location Area Update" (LAU), Routing Area Update (RAU) or Tracking Area Update (TAU), respectively. This update is initiated by using the PRACH.

In the case where many UEs are travelling during rush hour in a Tokyo subway 905, possibly up to 5000 UEs will perform almost at same time instance (when the subway crosses such a location area border) this update and will therefore access the PRACH. This leads regularly to a PRACH overload. All UEs within the coverage area of this cell (at the new suitable NodeB) are affected, i.e. also UEs which are not in the subway. No UE can e.g. establish a connection during this PRACH overload. To resolve the PRACH overload problem, the NodeBs along the track 975, which would be affected by PRACH blocking, are aware of this issue and will apply the "PRACH blocking avoidance" mode.

As the subway 905 arrives at the first location area 915, the NodeB 910 switches to PRACH overload avoidance mode and broadcasts a corresponding signal 980 in its radio cell (the first location area 915). The signal 980, which indicates the PRACH overload avoidance mode of NodeB 910, is received by the mobile communication terminal 945 (and all other UEs which are listening to broadcasted signals of the NodeB 910). As a result, the mobile communication terminal 945 accordingly sets its parameters for PRACH access to PRACH overload avoidance mode, e.g. it uses a very long initial POW 850 (see FIG. 8).

The signaling of the PRACH overload avoidance mode with the signal 980 can be done in different ways.

In an embodiment, the affected NodeB transmits the parameters for the special PRACH occasions windows to be used for PRACH overload avoidance mode (e.g. POWs 850, 855) in the broadcasted system information. Here the signal 980 is formed by a piece of broadcasted system information indicating these parameters. The way to receive POW parameters by an UE is the same for "PRACH blocking avoidance" mode and for normal mode. This has the effect, that no special algorithm has to be implemented in the UE for switching to "PRACH blocking avoidance" mode.

Alternatively, a special flag is broadcasted by the affected NodeB, which may be called the "Area Update Delay Flag". The special flag may be broadcasted as a part of the system information. Here the signal 980 is formed by the broadcasted flag. In this case, special values for the PRACH occasions windows to be applied in PRACH overload avoidance mode (e.g. POWs 850, 855) are predefined and stored in the UE, and will be applied immediately by the UE as soon as the flag is received. This has the effect, that the UE does not need to read all parameters for the PRACH occasions windows from the broadcasted system information. To read the flag is sufficient.

When to switch in "PRACH blocking avoidance" mode can be derived by a NodeB in different ways.

In an embodiment, a NodeB, which is currently in such a blocked PRACH state, will inform a neighboring NodeBs about this fact. The informed NodeB will then switch to the PRACH blocking avoidance mode. When the subway 905 reaches a NodeB, which is in "PRACH blocking avoidance" mode, the blocking will be avoided.

For example, the affected NodeB 910 informs the neighbouring NodeB 920 by transmitting the message 985 ("PRACH overload warning"). The message 985 indicating the PRACH overload avoidance mode (blocking avoidance mode) of NodeB 910 is sent by the messaging unit 940. At the beginning, the neighbouring NodeB 920 is in normal mode, which is broadcasted in the radio cell by a signal 990. After NodeB 920 has received the message 985, it switches to PRACH overload avoidance mode and changes the broadcasted signal 990 appropriately.

Alternatively, the network operator knows the date and time, when such PRACH blocking usually will occur. Based on that knowledge an affected NodeB will switch time based to PRACH blocking avoidance mode.

According to an embodiment of the invention, any embodiment defined by one of the claims may be combined with any one or more other embodiments defined by respective one or more of the other claims.

The following publications are cited in this document:
[1] 3GPP TS 36.211: E-UTRA; Physical channels and modulation (Release 8);
[2] 3GPP TS 25.211: Physical channels and mapping of transport channels onto physical channels (FDD) (Release 7);
[3] New WID: Stage2 for Registration in Densely-populated area (RED), from 3GPP-Meeting TSGS#37, Document-Number SP-070694.

The invention claimed is:

1. Method of accessing a physical random access channel comprising:
selecting a plurality of transmission occasions from transmission occasions being allowed for transmitting a random access preamble in a predefined transmission frequency region which is different from a previous predefined transmission frequency region, if a previous random access preamble transmission based on the previous predefined transmission frequency region was not acknowledged by a base station;
randomly selecting one transmission occasion of the plurality of transmission occasions for transmitting the random access preamble transmission; and
transmitting the random access preamble in the randomly selected transmission occasion;
wherein the selecting of the plurality of transmission occasions depends on a priority of transmitting the random access preamble, the plurality of transmission occasions including less transmission occasions in case of a higher priority and including more transmission occasions in case of a lower priority.

2. The method as recited in claim 1, wherein the selecting a plurality includes setting a time window, the time window including the plurality occasions.

3. The method as recited in claim 1, wherein the selecting a plurality includes setting a time window, the time window defining the plurality of transmission occasions, the plurality of transmission occasions including each transmission occasion being allowed for transmitting the random access preamble transmission which falls into the time window.

4. The method as recited in claim 3, wherein the setting a time window depends on a priority of transmitting the random access preamble, the time window being shorter in case of a higher priority and being longer in case of a lower priority.

5. The method as recited in claim 3, wherein the setting a time window includes setting the time window to a value shorter than a previous value of the time window, if a previous random access preamble transmission based on the previous value of the time window was not acknowledged by a base station.

6. The method as recited in claim 1, wherein the selecting a plurality
includes setting a time window for each transmission frequency region in which transmitting the random access preamble is allowed, each respective time window defining a respective plurality of transmission occasions for the respective transmission frequency region.

7. The method as recited in claim 6, wherein the randomly selecting includes randomly selecting one transmission occasion of one of the respective pluralities of transmission occasions.

8. The method as recited in claim 7, wherein the one of the respective pluralities of transmission occasions is associated with a transmission frequency region which is different from a previous transmission frequency region, if a previous random access preamble transmission based on the previous transmission frequency region was not acknowledged by a base station.

9. The method as recited in claim 1, wherein the selecting a plurality depends on a purpose of transmitting the random access preamble transmission.

10. The method as recited in claim 1, wherein the transmission occasions being allowed for transmitting the random access preamble are subframes of the physical random access channel.

11. The method as recited in claim 10, wherein the randomly selecting includes disregarding, at the randomly selecting, a subframe at a specific frame position, if a previous random access preamble transmission at the specific frame position was not acknowledged by a base station.

12. The method as recited in claim 1, wherein the physical random access channel is a physical random access channel of the Universal Mobile Telecommunications System Terrestrial Radio Access Network.

13. A mobile communication terminal, comprising:
a control unit to select a plurality of transmission occasions from transmission occasions being allowed transmitting a random access preamble in a predefined transmission frequency region which is different from a previous predefined transmission frequency region, if a previous random access preamble transmission based on the previous predefined transmission frequency region was not acknowledged by a base station and further to randomly select one transmission occasion of the plurality of transmission occasions for transmitting the random access preamble; and
a transmit unit to transmit the random access preamble in the randomly selected transmission occasion;
wherein the control unit is to include less transmission occasions in the plurality of transmission occasions in case of a higher priority of transmitting the random access preamble and include more transmission occasions in the plurality of transmission occasions in case of a lower priority of transmitting the random access preamble.

14. Method of signaling access information for accessing a physical random access channel, comprising:
broadcasting parameter information for determining transmission occasions being allowed for transmitting a random access preamble in a predefined transmission frequency region which is different from a previous predefined transmission frequency region, if a previous access preamble transmission based on the previous predefined transmission frequency region was not acknowledged by a base station; and broadcasting a piece of information indicating how to select a plurality of occasions from the transmission occasions being allowed for transmitting the random access preamble, the piece of information further indicating that the random access preamble may only be transmitted in one randomly selected transmission occasion of the plurality of transmission occasions;

wherein the selecting of the plurality of transmission occasions includes selecting less transmission occasions in case of a higher priority of transmitting the random access preamble and includes selecting more transmission occasions in case of a lower priority of transmitting the random access preamble.

15. The method as recited in claim 14, wherein the piece of information further indicates a blocking avoidance mode of the physical random access channel.

16. The method as recited in claim 14, wherein the indicating how to select a plurality includes indicating to select the plurality such that it includes a large number of transmission time intervals if the transmitting the random access preamble transmission is for the purpose of an area update in an idle mode.

17. The method as recited in claim 14, further comprising: sending a message to a base station serving a cell of a cellular network, the message indicating a blocking avoidance mode of the physical random access channel in a neighbouring cell of the cell.

18. A base station, comprising:

a broadcasting unit to broadcast parameter information for determining transmission occasions being allowed for transmitting a random access preamble in a predefined transmission frequency region which is different from a previous predefined transmission frequency region, if a previous random access preamble transmission based on the previous predefined transmission frequency region was not acknowledged by a base station and further to broadcast a piece of information indicating how to select a plurality of transmission occasions from the transmission occasions being allowed for transmitting the random access preamble, the piece of information further indicating that the random access preamble may only be transmitted in one randomly selected transmission occasion of the plurality of transmission occasions;

wherein the plurality of transmission occasions are to be selected by including less transmission occasions in case of a higher priority of transmitting the random access preamble and more transmission occasions in case of a lower priority of transmitting the random access preamble.

19. The base station as recited in claim 18, further comprising:

a messaging unit to send a message to a neighbouring base station of the base station, the message indicating a blocking avoidance mode of the physical random access channel at the base station.

* * * * *